United States Patent
Ma et al.

(10) Patent No.: US 12,007,819 B2
(45) Date of Patent: Jun. 11, 2024

(54) METHOD AND APPARATUS FOR STARTING UP DIGITAL CURRENCY DATA PROCESSING DEVICE, AND DIGITAL CURRENCY DATA PROCESSING DEVICE

(71) Applicant: SHENZHEN MICROBT ELECTRONICS TECHNOLOGY CO., LTD., Shenzhen (CN)

(72) Inventors: Weibin Ma, Shenzhen (CN); Lihong Huang, Shenzhen (CN); Yuefeng Wu, Shenzhen (CN); Zuoxing Yang, Shenzhen (CN)

(73) Assignee: SHENZHEN MICROBT ELECTRONICS TECHNOLOGY CO., LTD., Shenzhen (CN)

(*) Notice: Subject to any disclaimer, the term of this patent is extended or adjusted under 35 U.S.C. 154(b) by 66 days.

(21) Appl. No.: 17/798,507

(22) PCT Filed: Mar. 30, 2021

(86) PCT No.: PCT/CN2021/083785
§ 371 (c)(1),
(2) Date: Aug. 9, 2022

(87) PCT Pub. No.: WO2021/208717
PCT Pub. Date: Oct. 21, 2021

(65) Prior Publication Data
US 2023/0078250 A1    Mar. 16, 2023

(30) Foreign Application Priority Data
Apr. 16, 2020   (CN) .......................... 202010299781.4

(51) Int. Cl.
*G06F 1/20*    (2006.01)
*G06F 1/04*    (2006.01)
*G06F 1/26*    (2006.01)

(52) U.S. Cl.
CPC .................. *G06F 1/20* (2013.01); *G06F 1/04* (2013.01); *G06F 1/26* (2013.01)

(58) Field of Classification Search
CPC .................. G06F 1/20; G06F 1/04; G06F 1/26
(Continued)

(56) References Cited

U.S. PATENT DOCUMENTS 3,629,854 A * 12/1971 Hauck ..................... G06F 13/37
                                                    710/123
4,696,578 A *  9/1987 Mansuria ........... G01R 31/2874
                                                    374/45
(Continued)

FOREIGN PATENT DOCUMENTS

CN    101782791 A    7/2010
CN    103616793 A    3/2014
(Continued)

OTHER PUBLICATIONS

Search Report, corresponding in Chinese patent application No. 202010299781.4, dated Mar. 1, 2021.
(Continued)

*Primary Examiner* — Paul R. Myers
(74) *Attorney, Agent, or Firm* — MARSHALL, GERSTEIN & BORUN LLP (57) ABSTRACT

A method and apparatus for starting up a digital currency data processing device, and a digital currency data processing device. The digital currency data processing device includes a hash board including a plurality of hash chip groups. The method includes: transmitting a startup signal to a refrigerating part of a data processing device before turning on a power supply; turning on the power supply; and controlling respective hash chips in each hash chip group to gradually and synchronously turn on cores. The above
(Continued)

arrangement improves voltage balance of a hash board, and also ensures the accuracy of a clock signal.

14 Claims, 4 Drawing Sheets

(58) Field of Classification Search
USPC .................................................. 713/399, 300
See application file for complete search history.

(56) References Cited

U.S. PATENT DOCUMENTS

| | | | | |
|---|---|---|---|---|
| 4,734,597 | A * | 3/1988 | Ullrich | H03L 1/00 |
| | | | | 377/79 |
| 5,469,390 | A * | 11/1995 | Sasaki | G11C 29/808 |
| | | | | 365/201 |
| 5,493,213 | A * | 2/1996 | Collins, Jr. | G06K 7/10851 |
| | | | | 324/759.03 |
| 5,546,023 | A * | 8/1996 | Borkar | G06F 1/10 |
| | | | | 327/293 |
| 5,822,596 | A * | 10/1998 | Casal | H03K 19/003 |
| | | | | 713/322 |
| 5,825,708 | A * | 10/1998 | Bennett | G06F 3/0614 |
| | | | | 365/226 |
| 5,973,527 | A * | 10/1999 | Schweighofer | H02M 7/53871 |
| | | | | 327/175 |
| 6,442,720 | B1 * | 8/2002 | Koprowski | G01R 31/31858 |
| | | | | 714/726 |
| 6,534,995 | B1 * | 3/2003 | Schell | G06F 1/206 |
| | | | | 713/300 |
| 7,392,446 | B1 * | 6/2008 | Simmons | G01R 31/31715 |
| | | | | 326/39 |
| 9,146,814 | B1 * | 9/2015 | van der Merwe | G06F 11/3058 |
| 9,482,584 | B2 * | 11/2016 | Im | G01K 7/34 |
| 10,381,758 | B1 * | 8/2019 | Scanlon | H01R 12/716 |
| 10,691,528 | B1 * | 6/2020 | Ferreira | G06F 11/1441 |
| 2003/0071670 | A1 * | 4/2003 | Shiratake | G11C 11/22 |
| | | | | 327/200 |
| 2004/0221084 | A1 * | 11/2004 | Yates | G01R 31/318508 |
| | | | | 710/305 |
| 2006/0284655 | A1 * | 12/2006 | Li | G06F 1/28 |
| | | | | 327/143 |
| 2007/0002536 | A1 * | 1/2007 | Hall | H05K 7/20754 |
| | | | | 361/695 |
| 2007/0047199 | A1 * | 3/2007 | Tsutsui | G06F 1/203 |
| | | | | 361/679.48 |
| 2012/0005516 | A1 * | 1/2012 | Bergmann | G06F 1/3237 |
| | | | | 713/375 |
| 2012/0216054 | A1 | 8/2012 | Cho et al. | |
| 2017/0063353 | A1 * | 3/2017 | Coteus | G06F 1/12 |
| 2017/0220433 | A1 | 8/2017 | Dimnaku et al. | |
| 2018/0089642 | A1 | 3/2018 | Suresh et al. | |
| 2019/0075686 | A1 | 3/2019 | Yu et al. | |
| 2019/0306190 | A1 * | 10/2019 | Suraparaju | G06F 21/602 |
| 2020/0051184 | A1 * | 2/2020 | Barbour | F02M 21/0209 |
| 2021/0203328 | A1 * | 7/2021 | Zhang | H03L 7/085 |

FOREIGN PATENT DOCUMENTS

| | | |
|---|---|---|
| CN | 105490675 A | 4/2016 |
| CN | 106502962 A | 3/2017 |
| CN | 108681520 A | 10/2018 |
| CN | 108693934 A | 10/2018 |
| CN | 109144230 A | 1/2019 |
| CN | 110489220 A | 11/2019 |
| CN | 110687990 A | 1/2020 |
| CN | 110825208 A | 2/2020 |
| CN | 111007893 A | 4/2020 |
| CN | 111538382 A | 8/2020 |
| CN | 112445302 A | 3/2021 |

OTHER PUBLICATIONS

Office Action, corresponding in Chinese patent application No. 202010299781.4, dated Apr. 16, 2021.
International Search Report for Application No. PCT/CN2021/083785, dated Jul. 2, 2021.

* cited by examiner

METHOD AND APPARATUS FOR STARTING UP DIGITAL CURRENCY DATA PROCESSING DEVICE, AND DIGITAL CURRENCY DATA PROCESSING DEVICE

This application claims priority to Chinese Patent Application No. 202010299781.4, filed with the China Patent Office on Apr. 16, 2020, entitled "Method and Apparatus for Starting up Digital Currency Mining Machine, and Digital Currency Mining Machine", the contents of which are hereby incorporated by reference in its entirety.

TECHNICAL FIELD

The present application belongs to the technical field of information, and in particular, to a method and apparatus for starting up a digital currency data processing device, and a digital currency data processing device.

BACKGROUND ART

Digital currency may be regarded as a virtual currency based on node networks and digital encryption algorithms. The core features of digital currency are mainly reflected in three aspects: 1, digital currency has no issuer due to some open algorithms; 2, a total amount of digital currency is fixed due to the determination of the number of algorithm solutions; and 3, a transaction process of digital currency is sufficiently secure since the transaction process requires the approval of individual nodes in the network.

With the rapid development of supercomputers, digital currency mining machines have evolved from graphic card mining machines to application specific integrated circuit (ASIC) mining machines with lower power consumption and lower cost.

The ASIC mining machine typically includes a control board and a hash board. The hash board may be provided with layered hash chip groups connected in series sequentially. Each layer of hash chip group may include a plurality of hash chips. When the control board receives a mining task, the mining task may be subdivided into a plurality of operation tasks, and the plurality of operation tasks are allocated to each hash chip group for calculation.

Currently, the hash board adopts series power supply. At time of power-on, interlayer voltage is unbalanced due to different internal resistance of the hash chips, thus affecting the normal startup of some chips.

SUMMARY OF THE INVENTION

Examples of the present application provide a method and apparatus for starting up a digital currency data processing device, and a digital currency data processing device.

The technical solutions of the examples of the present application are as follows.

A method for starting up a digital currency data processing device is provided. The digital currency data processing device includes a hash board. The hash board includes a plurality of hash chip groups. The method includes:
transmitting a startup signal to a refrigerating part of a data processing device before turning on a power supply;
turning on the power supply; and
controlling respective hash chips in each hash chip group to gradually and synchronously turn on cores.

An apparatus for starting up a digital currency data processing device is provided. The digital currency data processing device includes a hash board. The hash board includes a plurality of hash chip groups. The apparatus includes:
a transmitting module, configured to transmit a startup signal to a refrigerating part of a data processing device before turning on a power supply;
a turn-on module, configured to turn on the power supply; and
a control module, configured to control respective hash chips in each hash chip group to gradually and synchronously turn on cores.

An apparatus for starting up a digital currency data processing device includes:
a memory; and
a processor.

The memory stores an application executable by the processor for causing the processor to perform the aforementioned method for starting up a digital currency data processing device.

A digital currency data processing device includes:
a hash board; and
a control board, including: a memory and a processor, wherein the memory stores an application executable by the processor for causing the processor to perform the aforementioned method for starting up a digital currency data processing device.

The hash board is in a signal connection with the control board via a signal connection interface, and the hash board is in an electrical connection with the control board via a power connection interface.

A computer-readable storage medium stores computer-readable instructions for performing the aforementioned method for starting up a digital currency data processing device.

As can be seen from the aforementioned technical solutions, a digital currency data processing device includes a hash board including a plurality of hash chip groups. A startup signal is transmitted to a refrigerating part of a data processing device before turning on a power supply. The power supply is turned on. Respective hash chips in each hash chip group are controlled to gradually and synchronously turn on cores. As can be seen therefrom, after applying the embodiments of the present application, by reducing the chip temperature of the hash board before the power supply is turned on, leakage difference caused by the leakage current of the chips affected by the temperature can be reduced, thereby reducing the interlayer voltage of the chips, and facilitating the establishment of voltage balance and signal transmission during subsequent power-on.

Furthermore, by controlling respective hash chips in each hash chip group to gradually and synchronously turn on cores, the proportion of the leakage current of the chips in the total current can be gradually reduced, so that the voltage difference between the layers is gradually reduced, thereby finally establishing the voltage balance of the hash board.

In addition, by periodically inverting the clock signal, the accuracy of the clock signal can also be ensured.

DETAILED DESCRIPTION OF EMBODIMENTS

For the purpose of clarifying the objects, technical solutions and advantages of the present application, the present application will be further described in detail below in conjunction with the accompanying drawings.

For simplicity and clarity of description, the solutions of the present application are set forth below by describing a number of representative embodiments. Numerous details of the embodiments are set forth only to provide an understanding of the solutions of the present application. However, it will be apparent that the technical solutions of the present application may be implemented without being limited to these details. To avoid unnecessarily obscuring the solutions of the present application, some embodiments have not been described in detail, but rather have been provided with a framework. Hereinafter, "including" means "including but not limited to", and "according to" means "at least according to, but not limited to only according to". Because of Chinese language conventions, when the number of one component is not specified below, it means that there may be one or more components, or it may be understood that there is at least one component.

In the embodiments of the present application, a solution for starting up a digital currency data processing device is provided, which facilitates the normal startup of chips and the establishment of a chip voltage balance between various layers of a hash board. In the various embodiments of the present application, the digital currency data processing device may be, but is not limited to, a digital currency mining machine.

Figure 1:
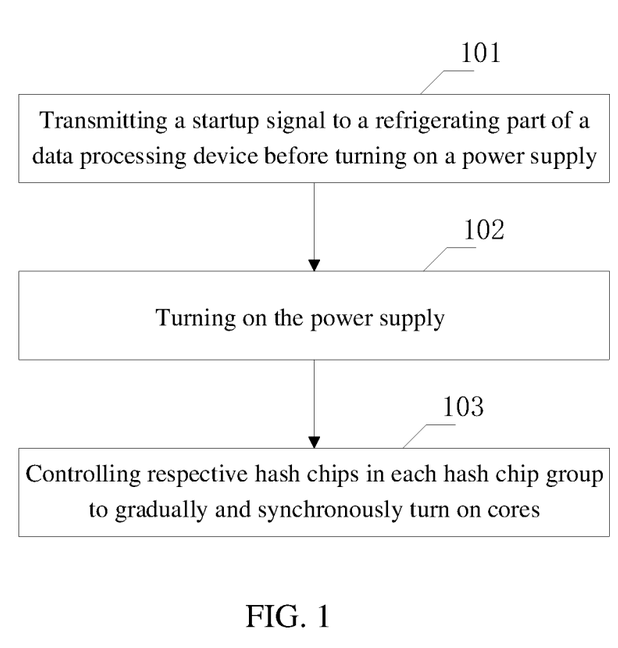
FIG. 1 is a flowchart of a method for starting up a digital currency data processing device according to the present application.

FIG. 1 is a flowchart of a method for starting up a digital currency data processing device according to the present application. The digital currency data processing device includes a hash board. The hash board includes a plurality of hash chip groups. Each hash chip group may include one or more hash chips.

As shown in FIG. 1, the method includes the following steps.

In step 101, a startup signal is transmitted to a refrigerating part of a data processing device before turning on a power supply.

Here, when it is determined that the data processing device has a startup demand and the power supply of the data processing device has not been turned on, the startup signal is transmitted to the refrigerating part of the data processing device to start up the refrigerating part of the data processing device, so that the refrigerating part of the data processing device starts to reduce the temperature of the hash board before the power supply of the data processing device is turned on. The refrigerating part of the data processing device is further controlled to output a maximum refrigerating power.

The refrigerating part of the data processing device may be configured to reduce the temperature of the data processing device. For example, the refrigerating part of the data processing device may specifically be an air-cooled part (e.g. a fan), or a water-cooled part (e.g. a water-cooled board), etc. While typical examples of the refrigerating part of the data processing device have been described above, it will be appreciated by those skilled in the art that such descriptions are merely exemplary and are not intended to limit the protection scope of the embodiments of the present application.

By reducing the chip temperature of the hash board, leakage difference caused by the leakage current of the chips affected by the temperature can be reduced, thereby reducing the interlayer voltage of the chips, and facilitating the establishment of voltage balance and signal transmission during subsequent power-on.

For example, when it is determined that the data processing device has a startup demand after receiving a restart command, a startup signal may be transmitted to the refrigerating part of the data processing device to reduce the chip temperature of the hash board in the process from turning off the data processing device to starting up the data processing device again. The time of turning on the power supply again may be delayed, so as to ensure that the chip temperature of the hash board is sufficiently reduced.

For another example, when it is determined that the data processing device has a startup demand after receiving a startup command, a startup signal may be transmitted to the refrigerating part of the data processing device to reduce the chip temperature of the hash board before the data processing device is started up. The time of turning on the power supply may be delayed, so as to ensure that the chip temperature of the hash board is sufficiently reduced.

In step 102, the power supply is turned on.

Here, the specific operation of turning on the power supply includes: transmitting a turn-on instruction to the power supply, so as to turn on the power supply. When the power supply is turned on, an electrical connection between the power supply and the hash board is established, and the hash board is powered on.

In one embodiment, the temperature of the hash board may be periodically detected using a temperature sensor on the hash board. The power supply is turned on when the temperature of the hash board is less than or equal to a predetermined threshold value. When the temperature of the hash board is higher than the predetermined threshold value, the power supply is temporarily not turned on, and the operation depends on a next detection value of the temperature sensor.

While the temperature threshold value of the hash board has been exemplarily described above, it will be appreciated by those skilled in the art that such descriptions are merely exemplary and are not intended to limit the protection scope of the embodiments of the present application.

In step 103, respective hash chips in each hash chip group are controlled to gradually and synchronously turn on cores.

Considering that there are generally a plurality of cores (e.g. hundreds of cores) inside the hash chip, a small amount of operating current will be increased when each core is turned on, so as to pull down the voltage of the current layer. Therefore, after the hash board is powered on, respective hash chips are powered on at the same time. At this moment, the respective hash chips in each hash chip group may be controlled to synchronously and gradually turn on the cores. At the time of synchronously and gradually turning on the cores, the proportion of leakage current of the hash chip in the total current will be gradually reduced, the voltage difference between the layers will gradually decrease, the voltage balance of the hash board will be gradually stabilized, and the voltage balance will be established finally.

The controlling the respective hash chips in each hash chip group to gradually and synchronously turn on cores includes: controlling the respective hash chips in each hash chip group to simultaneously turn on a predetermined number of cores. The ratio of the predetermined number of cores to a total number of cores in each hash chip is less than a predetermined threshold.

For example, the operation of gradually and synchronously turning on cores by respective hash chips includes: simultaneously turning on a predetermined number of cores by the respective hash chips. The ratio of the predetermined number to the total number of cores in the each hash chip is sufficiently small (e.g. less than five percent). For example, one core is turned on at a time.

For example, it is assumed that the hash board has N hash chip groups, each hash chip group has M hash chips, and each hash chip has 100 cores: cores 1-100, respectively. Then, respective cores 1 in all the hash chips are controlled to be turned on (cores 2-100 are temporarily not turned on) in a first timing sequence. Cores 2 in all the hash chips are controlled to be turned on (cores 3-100 are temporarily not turned on) in a second timing sequence. Similarly, cores 100 in all the hash chips are controlled to be turned on in a 100th timing sequence.

By controlling respective hash chips in each hash chip group to gradually and synchronously turn on cores, the proportion of the leakage current of the chips in the total current can be gradually reduced, so that the voltage difference between the layers is gradually reduced, thereby finally establishing the voltage balance of the hash board.

In one embodiment, after transmitting the startup signal to the refrigerating part of a data processing device in step 101 and before turning on the power supply in step 102, the method further includes: transmitting a reset signal to the hash board and holding the reset signal. For example, a reset signal may be transmitted to Reset pin of the hash board, and may be held. After turning on the power supply in step 102 and before controlling respective hash chips in each hash chip group to gradually and synchronously turn on cores in step 103, the method further includes: clearing the reset signal.

The applicant also found that the pull-up driving capability and pull-down driving capability of the hash chips are different, and in addition, a certain delay is required for the clock signal to pass through the hash chips, so that after the clock signal passes through a plurality of chips, an upper pulse width or lower pulse width proportion of the clock signal will gradually increase. Therefore, the clock signal passing through the hash chips approaching the tail of a chain-like structure is worse.

In one embodiment, a clock signal transmission path of the plurality of hash chip groups has a chain-like structure. After clearing the reset signal and before controlling respective hash chips in each hash chip group to gradually and synchronously turn on cores, the method further includes: providing a clock signal to a first hash chip in the clock signal transmission path; and inverting the clock signal when the clock signal passes through a predetermined number of hash chips. The predetermined number may be a theoretically calculated accurate value or an artificially set empirical value. The meaning of inverting the clock signal is: inverting high and low levels of the clock signal. The operation specifically includes: changing the high level of the clock signal into the low level, and changing the low level of the clock signal into the high level. Compared with the non-inverted clock signal, the upper pulse width proportion and the lower pulse width proportion of the inverted clock signal are replaced with each other. For example, the non-inverted clock signal has an upper pulse width proportion of M % and a lower pulse width proportion of N %, and the inverted clock signal has an upper pulse width proportion of N % and a lower pulse width proportion of M %, where M+N=100, and M and N are positive numbers.

For example, assuming that the predetermined number is 10, the upper pulse width proportion (the ratio of an upper pulse width length to a total pulse width length) of the clock signal increases by 1% every time the clock signal passes through a hash chip, and the clock signal provided to the first hash chip has an upper pulse width proportion 50% (accordingly, a lower pulse width proportion of 50%). Then, after the clock signal passes through the first hash chip, the upper pulse width proportion increases to 51% (accordingly, the lower pulse width proportion decreases to 49%). After the clock signal passes through the second hash chip, the upper pulse width proportion of the clock signal increases to 52% (accordingly, the lower pulse width proportion decreases to 48%), and so on. After the clock signal passes through the tenth hash chip, the upper pulse width proportion of the clock signal increases to 60% (accordingly, the lower pulse width proportion decreases to 40%). Before the clock signal is input to the eleventh hash chip, the high level of the clock signal is changed into the low level and the low level is changed into the high level, so that the clock signal is inverted. The upper pulse width proportion of the inverted clock signal is 40% (accordingly, the lower pulse width proportion is 60%). The inverted clock signal significantly reduces the upper pulse width proportion, and the upper pulse width proportion can be gradually restored after the clock signal passes through the subsequent hash chips. Therefore, the embodiments of the present application can periodically adjust the clock signal, thereby avoiding the defect that the clock signal passing through the hash chips approaching the tail is worse.

It can be seen that in the embodiments of the present application, clock initialization starts from an initial hash chip connected to a clock signal, and after every predetermined number of hash chips, the clock signal is inverted. This is because the upper pulse width or the lower pulse width of the clock signal will be gradually increased after every certain number of hash chips. At this moment, the upper pulse width proportion and the lower pulse width proportion of the clock signal may be replaced once by inverting once. On this basis, the continuous change of the pulse widths of the following clock chips will not cause clock signal problems.

Based on the aforementioned descriptions, examples of the embodiments of the present application will be described below.

Figure 2:
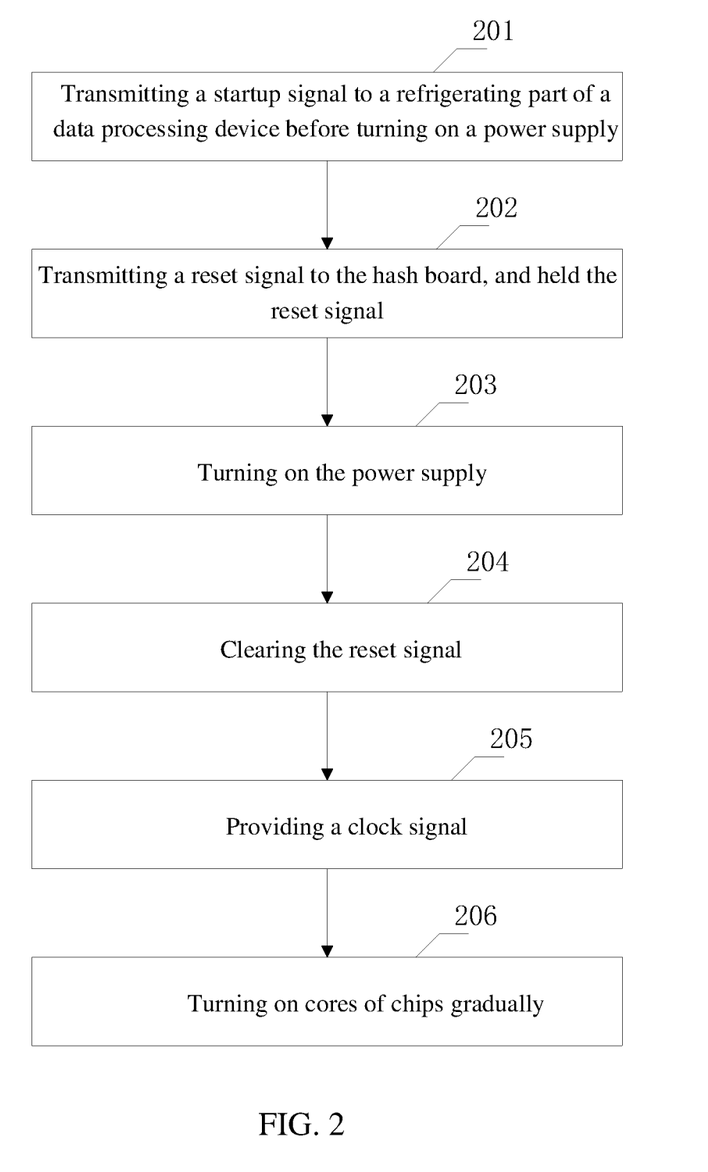
FIG. 2 is an exemplary flowchart of a method for starting up a digital currency data processing device according to the present application.

FIG. 2 is an exemplary flowchart of a method for starting up a digital currency data processing device according to the present application. A digital currency data processing device used in this method includes a hash board. The hash board includes a plurality of hash chip groups. Each hash chip group may include one or more hash chips.

Figure 3:
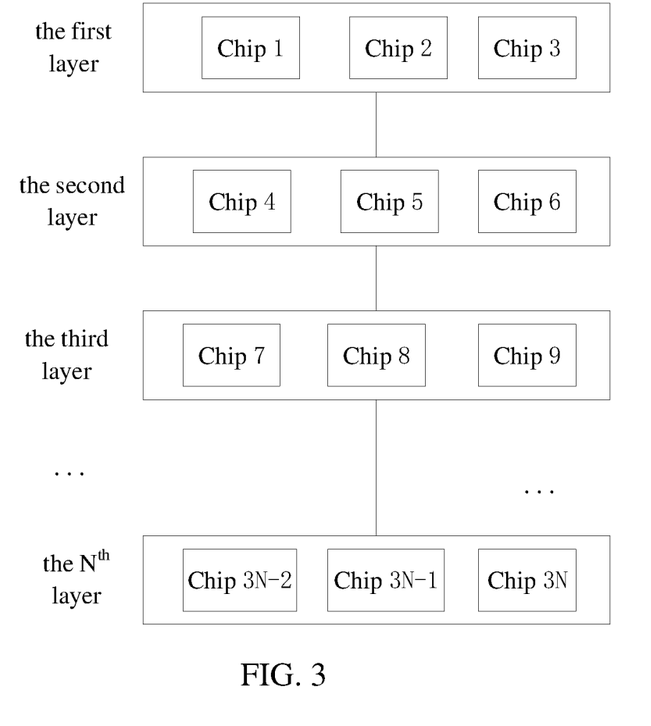
FIG. 3 is an exemplary architecture diagram of a hash board according to the present application.

For example, FIG. 3 is an exemplary architecture diagram of a hash board according to the present application. As can be seen from FIG. 3, the hash board includes N hash chip groups connected in series, so as to constitute N layers. Each hash chip group includes three hash chips connected in parallel. As can be seen, the first layer includes: chip 1, chip 2 and chip 3; the second layer includes: chip 4, chip 5 and chip 6; the third layer includes: chip 7, chip 8 and chip 9; . . . the Nth layer includes: chip 3N−2, chip 3N−1 and chip 3N. N is a positive integer of at least 2.

While it is exemplified above that each layer includes three hash chips, it will be appreciated by those skilled in the art that such descriptions are merely exemplary and are not intended to limit the protection scope of the embodiments of the present application.

As shown in FIG. 2, the method for starting up the hash board shown in FIG. 3 includes the following steps.

In step 201, a startup signal is transmitted to a refrigerating part of a data processing device before turning on a power supply.

Here, when it is determined that the data processing device has a startup demand and the power supply of the data processing device has not been turned on, a startup signal is transmitted to the refrigerating part of the data processing device to start up the refrigerating part of the data processing device and control the refrigerating part of the data processing device to output a maximum refrigerating power, so that the refrigerating part of the data processing device reduces the temperature of the hash board, before the power supply of the data processing device is turned on.

In step 202, a reset signal is transmitted to the hash board and held.

Here, a reset signal is transmitted to Reset pin of the hash board and held.

In step 203, the power supply of the data processing device is turned on.

Here, a turn-on instruction is transmitted to the power supply, so as to turn on the power supply. When the power supply is turned on, an electrical connection between the power supply and the hash board is established, and the hash board is powered on.

In step 204, the reset signal is cleared.

Here, the reset signal of Reset pin of the hash board is cleared.

In step 205, a clock signal is provided to the hash board.

A clock signal transmission path of the hash board shown in FIG. 3 has a chain-like structure. For example, the clock signal transmission path is: chip 1 of the first layer→chip 2 of the first layer→chip 3 of the first layer→chip 6 of the second layer→chip 5 of the second layer→chip 4 of the second layer→chip 7 of the third layer→chip 8 of the third layer→chip 9 of the third layer, . . . , the last hash chip of the hash board. Here, a clock signal such as a clock signal generated by a crystal oscillator of 24M is provided to the first hash chip (chip 1 of the first layer) in the clock signal transmission path. The clock signal is transmitted between the hash chips of the hash board along the clock signal transmission path, and the clock signal is inverted after passing through a predetermined number of hash chips.

For example, assuming that the predetermined number is 3, the clock signal sequentially passes through chip 1 of the first layer, chip 2 of the first layer and chip 3 of the first layer, and then the clock signal output from chip 3 of the first layer to chip 6 of the second layer is inverted. Then, after the inverted clock signal sequentially passes through chip 6 of the second layer, chip 5 of the second layer and chip 4 of the second layer, the clock signal output from chip 4 of the second layer to chip 7 of the third layer is inverted again.

While the embodiments of the present application have been described above with a predetermined number of 3, it will be appreciated by those skilled in the art that such descriptions are merely exemplary and are not intended to limit the protection scope of the embodiments of the present application.

In step 206, the hash chips gradually turn on cores.

Here, respective hash chips in each hash chip group are controlled to synchronously and gradually turn on cores. For example, it is assumed that each hash chip has 100 cores: cores 1-100, respectively. Then, each of chip 1, chip 2, chip 3, . . . , chip 3N is controlled to turn on respective cores 1 (cores 2-100 are temporarily not turned on at this moment) in a first timing sequence. Each of chip 1, chip 2, chip 3, . . . , chip 3N is controlled to turn on respective cores 2 (cores 3-100 are temporarily not turned on at this moment) in a second timing sequence. Similarly, each of chip 1, chip 2, chip 3, . . . , chip 3N is controlled to turn on respective cores 100 in a 100th timing sequence, whereupon all the cores are turned on.

Based on the aforementioned descriptions, embodiments of the present application also provide an apparatus for starting up a digital currency data processing device.

Figure 4:
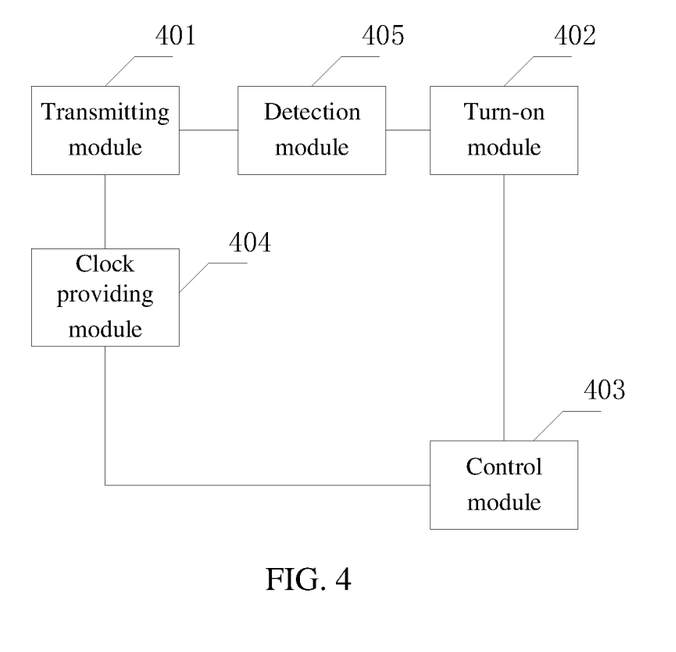
FIG. 4 is an exemplary structure diagram of an apparatus for starting up a digital currency data processing device according to the present application.

FIG. 4 is an exemplary structure diagram of an apparatus for starting up a digital currency data processing device according to the present application. The digital currency data processing device includes a hash board. The hash board includes a plurality of hash chip groups.

As shown in FIG. 4, the apparatus for starting up a digital currency data processing device includes:
- a transmitting module 401, configured to transmit a startup signal to a refrigerating part of a data processing device before turning on a power supply;
- a turn-on module 402, configured to turn on the power supply; and
- a control module 403, configured to control respective hash chips in each hash chip group to gradually and synchronously turn on cores.

In one embodiment, the transmitting module 401 is further configured to transmit, after the transmitting module transmits a startup signal to a refrigerating part of a data processing device and before the turn-on module turns on the power supply, a reset signal to the hash board and hold the reset signal, and release the reset signal after the turn-on module 402 turns on the power supply and before the control module 403 controls the respective hash chips in the each hash chip group to gradually and synchronously turn on the cores.

In one embodiment, a clock signal transmission path of the plurality of hash chip groups has a chain-like structure. The apparatus further includes: a clock providing module 404, located between the transmitting module 401 and the control module 403, and configured to provide a clock signal to a first hash chip in the clock signal transmission path, and invert the clock signal when the clock signal passes through a predetermined number of hash chips.

In one embodiment, the apparatus further includes the following module between the transmitting module 401 and the turn-on module 402: a detection module 405, configured to detect the temperature of the hash board. The turn-on module 402 turns on the power supply when the temperature of the hash board is lower than or equal to a predetermined threshold value.

Embodiments of the present application also provide an apparatus for starting up a digital currency data processing device having a memory-processor architecture.

Figure 5:
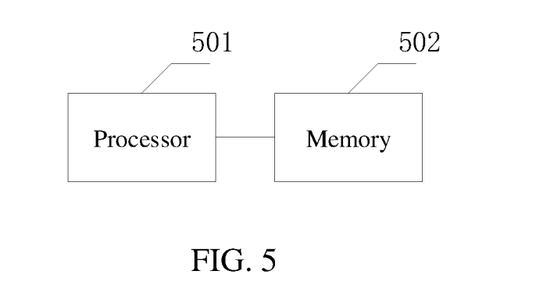
FIG. 5 is an exemplary structure diagram of an apparatus for starting up a digital currency data processing device having a memory-processor architecture according to the present application.

FIG. 5 is an exemplary structure diagram of an apparatus for starting up a digital currency data processing device having a memory-processor architecture according to the present application.

As shown in FIG. 5, the apparatus for starting up a digital currency data processing device includes:

a processor 501 and a memory 502. The memory 502 stores an application executable by the processor 501 for causing the processor 501 to perform the aforementioned method for starting up a digital currency data processing device.

The memory 502 may specifically be various storage media such as an electrically erasable programmable read only memory (EEPROM), a flash memory, a programmable read only memory (PROM), etc. The processor 501 may include one or more central processing units (CPU), or one or more field programmable gate arrays (FPGA). The FPGA integrates one or more CPU cores. Specifically, the CPU or CPU core may be a CPU, a microcontroller unit (MCU), or a digital signal processor (DSP).

Figure 6:
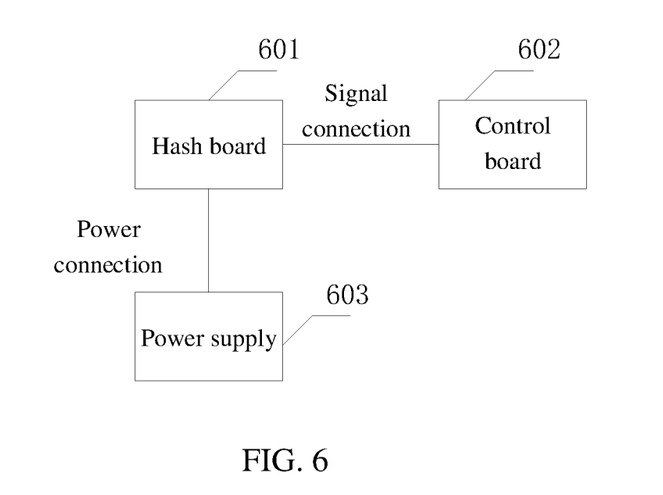
FIG. 6 is an exemplary structure diagram of a digital currency data processing device according to the present application.

Embodiments of the present application also provide a digital currency data processing device. FIG. 6 is an exemplary structure diagram of a digital currency data processing device according to the present application.

As shown in FIG. 6, the digital currency data processing device includes:

a hash board 601; and a control board 602, including: a memory and a processor. The memory stores an application executable by the processor for causing the processor to perform the aforementioned method for starting up a digital currency data processing device. The hash board 601 is in a signal connection with the control board 602 via a signal connection interface. The hash board 601 is in an electrical connection with a power supply 603 via a power connection interface.

It should be noted that not all the steps and modules in the above flow charts and structural diagrams are necessary, and some steps or modules may be omitted according to actual requirements. The order of execution of the various steps is not fixed and may be adjusted as required. The division of the various modules is merely to facilitate the description of the functional division adopted. In actual implementation, one module may be implemented by a plurality of modules. The functions of the plurality of modules may also be realized by the same module. These modules may be located in the same device or in different devices.

Hardware modules in the various embodiments may be implemented mechanically or electronically. For example, a hardware module may include a specially designed permanent circuit or logic device (e.g. a dedicated processor such as an FPGA or an ASIC) to perform a particular operation. The hardware module may also include a programmable logic device or circuit (e.g. including a general purpose processor or other programmable processors) temporarily configured by software to perform a particular operation. The implementation of the hardware modules mechanically, or using a dedicated permanent circuit, or using a temporarily configured circuit (e.g. configured by software) may be determined based on cost and time considerations.

The present application also provides a machine-readable storage medium storing instructions for causing a machine to perform the method as described herein. Specifically, a system or apparatus with a storage medium may be provided. A software program code that realizes the functions of any one embodiment in the above example is stored on the storage medium, and a computer (or a CPU or an MPU) of the system or apparatus is caused to read out and execute the program code stored in the storage medium. In addition, some or all of actual operations may be performed by means of an operating system or the like operating on the computer through instructions based on the program code. The program code read out from the storage medium may also be written into a memory provided in an expansion board inserted into the computer or into a memory provided in an expansion unit connected to the computer. Then, an instruction based on the program code causes a CPU or the like installed on the expansion board or the expansion unit to perform some or all of the actual operations, thereby realizing the functions of any one of the aforementioned embodiments.

According to one aspect of the present application, a computer program product or computer program is provided. The computer program product or computer program includes a computer instruction stored in a computer-readable storage medium. A processor reads the computer instruction from the computer-readable storage medium. The processor executes the computer instruction for performing the aforementioned method for starting up a digital currency data processing device.

Embodiments of a storage medium for providing program code include floppy disks, hard disks, magneto-optical disks, optical disks (e.g. CD-ROM, CD-R, CD-RW, DVD-ROM, DVD-RAM, DVD-RW, DVD+RW), magnetic tapes, non-volatile memory cards, and ROMs. The program code may be downloaded from a server computer or cloud via a communication network.

As used herein, "schematic" means "serving as an instance, example, or illustration". Any illustration and embodiment described herein as "schematic" should not be construed as a more preferred or advantageous technical solution. For simplicity of the drawings, only those portions related to the present application are schematically depicted in the figures and are not representative of an actual structure of a product. In addition, for simplicity and ease of understanding, only one of components having the same structure or function is schematically drawn or marked in some figures. As used herein, "one" does not mean to limit the number of portions related to the present application to "only one", and "one" does not mean to exclude the case that the number of portions related to the present application is "more than one". As used herein, "upper", "lower", "front", "back", "left", "right", "inner", "outer", and the like are used merely to indicate relative positional relationships between related portions, and do not limit absolute positions of these related portions.

The aforementioned descriptions are merely preferred examples of the present application and are not intended to limit the protection scope of the present application. Any modifications, equivalent replacements, improvements, etc. that come within the spirit and principles of the present application are intended to be within the protection scope of the present application.

What is claimed is:

1. A method for starting up a digital currency data processing device, the digital currency data processing device comprising a hash board and the hash board comprising a plurality of hash chip groups, the method comprising:

transmitting a startup signal to a refrigerating part of a data processing device before turning on a power supply;

turning on the power supply; and controlling respective hash chips in each hash chip group to gradually and synchronously turn on cores, comprising:

controlling the respective hash chips in the each hash chip group to simultaneously turn on a predetermined number of cores, wherein the ratio of the predetermined number of cores to a total number of cores in each hash chip is less than a predetermined threshold.

2. The method for starting up the digital currency data processing device according to claim 1, wherein
after transmitting the startup signal to the refrigerating part of the data processing device and before turning on the power supply, the method further comprises: transmitting a reset signal to the hash board and holding the reset signal; and
after turning on the power supply and before controlling the respective hash chips in the each hash chip group to gradually and synchronously turn on the cores, the method further comprises: clearing the reset signal.

3. The method for starting up the digital currency data processing device according to claim 2, wherein a clock signal transmission path of the plurality of hash chip groups is provided with a chain-like structure; after clearing the reset signal and before controlling the respective hash chips in the each hash chip group to gradually and synchronously turn on the cores, the method further comprises:
providing a clock signal to a first hash chip in the clock signal transmission path; and
inverting the clock signal when the clock signal passes through a predetermined number of hash chips.

4. The method for starting up the digital currency data processing device according to claim 1, wherein after transmitting the startup signal to the refrigerating part of the data processing device and before turning on the power supply, the method further comprises:
detecting a temperature of the hash board; and
starting to turn on the power supply when the temperature of the hash board is lower than or equal to a predetermined threshold value.

5. The method for starting up the digital currency data processing device according to claim 1, wherein
after transmitting the startup signal to the refrigerating part of the data processing device and before turning on the power supply, the method further comprises: transmitting a reset signal to the hash board and holding the reset signal; and
after turning on the power supply and before controlling the respective hash chips in the each hash chip group to gradually and synchronously turn on the cores, the method further comprises: clearing the reset signal.

6. An apparatus for starting up a digital currency data processing device, comprising:
a memory; and
a processor,
wherein the digital currency data processing device comprising a hash board and the hash board comprising a plurality of hash chip groups, the memory stores an application executable by the processor for causing the processor to perform:
transmitting a startup signal to a refrigerating part of a data processing device before turning on a power supply;
turning on the power supply; and
controlling respective hash chips in each hash chip group to gradually and synchronously turn on cores, comprising:
controlling the respective hash chips in the each hash chip group to simultaneously turn on a predetermined number of cores, wherein the ratio of the predetermined number of cores to a total number of cores in each hash chip is less than a predetermined threshold.

7. The apparatus for starting up the digital currency data processing device according to claim 6, wherein the processor is configured to:
after transmitting the startup signal to the refrigerating part of the data processing device and before turning on the power supply, the method further comprises: transmitting a reset signal to the hash board and holding the reset signal; and
after turning on the power supply and before controlling the respective hash chips in the each hash chip group to gradually and synchronously turn on the cores, the method further comprises: clearing the reset signal.

8. The apparatus for starting up the digital currency data processing device according to claim 7, wherein a clock signal transmission path of the plurality of hash chip groups is provided with a chain-like structure; after clearing the reset signal and before controlling the respective hash chips in the each hash chip group to gradually and synchronously turn on the cores, the processor is configured to:
providing a clock signal to a first hash chip in the clock signal transmission path; and
inverting the clock signal when the clock signal passes through a predetermined number of hash chips.

9. The apparatus for starting up the digital currency data processing device according to claim 6, wherein after transmitting the startup signal to the refrigerating part of the data processing device and before turning on the power supply, the processor is configured to:
detecting a temperature of the hash board; and
starting to turn on the power supply when the temperature of the hash board is lower than or equal to a predetermined threshold value.

10. A digital currency data processing device, comprising:
a hash board, comprising a plurality of hash chip groups; and
a control board, comprising: a memory and a processor;
wherein the hash board is in a signal connection with the control board via a signal connection interface, and the hash board is in an electrical connection with a power supply via a power connection interface;
wherein the memory stores an application executable by the processor for causing the processor to perform:
transmitting a startup signal to a refrigerating part of a data processing device before turning on a power supply;
turning on the power supply; and
controlling respective hash chips in each hash chip group to gradually and synchronously turn on cores, comprising:
controlling the respective hash chips in the each hash chip group to simultaneously turn on a predetermined number of cores, wherein the ratio of the predetermined number of cores to a total number of cores in each hash chip is less than a predetermined threshold.

11. The digital currency data processing device according to claim 10, wherein the processor is configured to:
controlling the respective hash chips in the each hash chip group to simultaneously turn on a predetermined number of cores, wherein the ratio of the predetermined number of cores to a total number of cores in each hash chip is less than a predetermined threshold.

12. The digital currency data processing device according to claim 11, wherein the processor is configured to:
after transmitting the startup signal to the refrigerating part of the data processing device and before turning on the power supply, the method further comprises: transmitting a reset signal to the hash board and holding the reset signal; and after turning on the power supply and before controlling the respective hash chips in the each hash chip group to gradually and synchronously turn on the cores, the method further comprises: clearing the reset signal.

13. The digital currency data processing device according to claim 12, wherein a clock signal transmission path of the plurality of hash chip groups is provided with a chain-like structure; after clearing the reset signal and before controlling the respective hash chips in the each hash chip group to gradually and synchronously turn on the cores, the processor is configured to:

providing a clock signal to a first hash chip in the clock signal transmission path; and inverting the clock signal when the clock signal passes through a predetermined number of hash chips.

14. The digital currency data processing device according to claim 11, wherein after transmitting the startup signal to the refrigerating part of the data processing device and before turning on the power supply, the processor is configured to:

detecting a temperature of the hash board; and starting to turn on the power supply when the temperature of the hash board is lower than or equal to a predetermined threshold value.

* * * * *